United States Patent [19]

Meister

[11] 4,164,596
[45] Aug. 14, 1979

[54] METHOD FOR COATING SURFACES OF TOOLS WITH FIRE AND HEAT RESISTANT COMPOSITION

[76] Inventor: Frank X. Meister, 6307 N. Navajo, Chicago, Ill. 60645

[21] Appl. No.: 858,739

[22] Filed: Dec. 8, 1977

Related U.S. Application Data

[63] Continuation-in-part of Ser. No. 743,855, Nov. 22, 1976, abandoned.

[51] Int. Cl.$^2$ .......................... B05D 3/00; B05D 3/02; C04B 43/10
[52] U.S. Cl. .................. 427/372 B; 106/38.3; 106/84; 252/62; 427/372 R; 427/372 A; 427/421; 427/430 R; 427/429; 428/920; 427/226
[58] Field of Search .......................... 106/84, 38.3, 14; 252/62; 427/372 R, 372 A, 372 B, 421, 430 R, 429, 226; 428/920

[56] References Cited

U.S. PATENT DOCUMENTS

| | | | |
|---|---|---|---|
| 973,557 | 10/1910 | Peterson | 106/84 |
| 2,549,516 | 4/1951 | Parry | 427/380 |
| 2,711,974 | 6/1955 | Happe | 106/84 |
| 3,207,624 | 9/1965 | Burrage et al. | 106/84 |
| 3,663,290 | 5/1972 | Klinge | 428/920 |

OTHER PUBLICATIONS

Dictionary of Mining, Mineral and Related Terms, Paul W. Thrush and Staff of the Bureau of Miner, 1968 pp. 429, 955.

*Primary Examiner*—John D. Smith
*Attorney, Agent, or Firm*—Jakala, Knechtel, Valentino, Demeur & Dallas

[57] ABSTRACT

A method of coating a tool surface to render the tool fire and heat resistant which includes the steps of providing a tool having a surface utilized in connection with high heat and fire encountering applications, providing a composition which includes from about 3 to about 8 parts by volume of Sagger's Clay, from about 3 to about 8 parts by volume of a soluble alkali silicate, from about 3 parts to about 8 parts by volume of granular mica in a laminated silica mineral form, and from about ½ part to about 2 parts by volume of water, applying the composition to the working surface of the tool which is intended for high heat and fire encountering applications, and allowing the composition to dry on the surface of the working tool thereby to provide a heat and fire resistant coating thereon.

7 Claims, No Drawings

METHOD FOR COATING SURFACES OF TOOLS WITH FIRE AND HEAT RESISTANT COMPOSITION

CROSS REFERENCE TO A RELATED APPLICATION

This application is a continuation-in-part application of application Ser. No. 743,855 now abandoned, entitled FIRE AND HEAT RESISTANT COMPOSITION FOR COATING SURFACES OF TOOLS, and filed in the name of Frank X. Meister under a filing date of Nov. 22, 1976.

FIELD OF THE INVENTION

This invention relates to a new and improved method for coating the working surface of a tool intended for high heat and fire encountering application by providing a composition which is stable suspension form, and is readily applied to the surface of a working tool in order to accommodate such applications. In particular, the invention relates to the method and the composition whereby the method is performed which finds use on a variety of work surfaces subject to destructive fire and high temperatures, and is particularly useful in connection with nozzles used in MIG welding to substantially extend the life of such nozzles.

RELEVANT BACKGROUND OF THE INVENTION

There have been numerous attempts in the art to provide protective compositions for metal surfaces subject to destructive fire and high temperatures, and many of these compositions utilize clays and soluble sodium silicates. For example, U.S. Pat. No. 2,711,974 teaches a combination of sodium silicate with Kaolin clay as well as various metal oxides. Other teachings have combined special types of clay such as Kentucky Ball Clay with pigments such as titanium dioxide, see U.S. Pat. Nos. 2,785,091, 2,372,235 teaches a combination of an alkali silicate, a clay and a pigment. Such patent also discusses the two broad categories of clay, either Kaoline or Bentonite, both being soluble hydrated aluminum silicates, the Bentonite having more silica in proportion to the alumina. U.S. Pat. No. 2,549,516 teaches the art the manufacture of decorative structural panels for interior wall linings wherein the sub-coat contains sodium or potassium silicate, diatomaceous silica, quartz silica a Kaolinite type clay, water and pigments which may be titanium oxide, chrome oxide (green), iron oxides or ultra marine blue. The listed diatomaceous and quartz silicas poorly mix with water and the proportions taught do not provide flowable liquid compositions.

In addition, U.S. Pat. No. 3,207,624 discloses a composition which is intended to be used as an insulating coating in connection with negative resistance valve blocks. The coatings are shown to contain potassium silicate, zinc oxide, powdered mica, and Kaolin clay. However, it will be noted that the alkali silicate in the form of potassium silicate is present in an extremely high percentage by weight, and further, the composition disclosed therein is not intended to be flowable in the same manner as the composition provided by the present invention. Hence, the composition as shown in the above noted patent clearly cannot function efficiently as a fire and heat resistant coating as intended in the present invention.

Similar comments are applicable with respect to U.S. Pat. No. 973,557 which discloses an improved insulating material formed by mica fragments and which further include components such as glass, Kaolin clay, slate, silicate of soda and water. However, the composition disclosed therein, to be formed into a suitable insulating material, must be fired to a temperature of at least 300° F., plunged into an insulating material which is absorbed into a mass, and then fired again at 400° C. It is clearly apparent that the composition is not intended to be freely flowable once formulated and furthermore, it is clear that the coating is not intended to be in the form of a retrofit or flowable coating suitable for application on the working surface of the tool.

The present invention is, therefore, intended to provide a method which includes the use of a novel composition formed by a variety of ingredients present at certain ranges of percentages by volume which will afford to the working surface of the tools greatly improved fire and heat resistance characteristics.

OBJECTS AND ADVANTAGES OF THE PRESENT INVENTION

It is therefore an object of the present invention to provide an improved method for rendering the working surface of a tool heat and fire resistant which basically incorporates the step of providing a composition in stable suspension form which can readily be applied to the working surfaces of the tool which encounter destructive fire and high temperatures, in which the composition displays improved properties in protecting the work surface from such high heat and fire characteristics encountered in the application of the tool A further object of the invention is to provide an improved method of the type described wherein the composition so provided combines an improved clay and a very fine form of silica to impart protection to the tool working surface which encounters the high heat and fire conditions, especially in connection with tools such as nozzles used in MIG welding.

In connection with the foregoing objects, it is yet a further object of the invention to provide a method of the type described which includes the step of providing a composition including from about 3 to about 8 parts by volume of Sagger's Clay, from about 3 parts to about 8 parts by volume of a soluble alkali silicate, from about 3 parts to about 8 parts by volume of granular mica in a laminated silica mineral form, and from about 1 part to about 2 parts by volume of water. Thereafter, the method of the present invention provides the step of applying the freely flowable composition onto the working surface of the tool by dipping, spraying or brushing, and then permitting the composition to become fully dried such that the working surface of the tool is encased by a fire and heat resistant coating.

Further features of the invention pertain to the particular arrangement of the elements and parts whereby the aboveoutlined and additional operating features thereof are attained.

The invention, both as to its organization and method of operation, together with further objects and advantages thereof, will best be understood by reference to the following specification.

SUMMARY OF THE INVENTION

The invention basically resides in the provision of a new method for rendering the working surfaces of a tool far more fire and heat resistant than heretofore known in the past. The essence of the invention is in the provision of a composition which is an irreversible suspension in an easily flowable liquid form in order to allow easy application, particularly by means such as dipping, when protecting the working surface of the tool, especially as in connection with nozzles used in MIG welding.

The destructive temperatures of MIG welding reach 8000° F. at the point of dispersal, whether globular or spray transfer. The composition comprises a mixture of about equal parts of a soluble alkali silicate, a finely divided granular mica of the laminated silica mineral form, water and clay found to have unique properties in this field, known as Sagger's Clay. In a particular form, the composition contains red led or $Pb_2O_3$. This pigment imparts a characteristic red or pink color to the composition, and it is possible that this particular pigment contributes useful properties to the composition other than color. The proportions are not critical except that the resulting suspension must be an easily flowable liquid. It is important that the form of the composition allows easy application as by dipping, spraying, brushing or the like. Generally, the Sagger's Clay, the alkali silicate such as sodium silicate or potassium silicate and the finely divided granular mica in the laminated mineral silica form are present in about equal parts by volume. The mica preferably has a mesh size of at least 300. Then about 1/5 part by volume of water is added, and finally red lead pigment in very small volumes. Generally, each of the equal parts by volume can be varied from about 3 to about 8 parts by volume to vary the proportions. About ½ to about 2 parts by volume of water may be used, and the red lead may be present from about 1/20 to about 1/10 parts by volume.

DETAILED DESCRIPTION OF THE INVENTION

The following example is presented to illustrate a preferred embodiment of the composition which is readily applied to the working surface of a tool such as a nozzle used in MIG welding.

EXAMPLE I

| Ingredient | Parts by Volume |
|---|---|
| Sagger's Clay | 5 |
| Sodium Silicate | 5 |
| Mica (laminated silica mineral form) | 5 |
| Water | 1 |

The following example illustrates still another embodiment of the composition which is readily applied to the working surface of the tool.

EXAMPLE II

| Ingredient | Grams | % by weight |
|---|---|---|
| Sagger's Clay | 38.1 | 18 |
| Mica, 325 Mesh | 29.2 | 14 |
| Sodium Silicate | 64.5 | 30 |
| Tap water | 75.0 | 35 |

The Sagger's Clay is obtained from H. C. Spinks Clay Co., Inc. P.O. Box 820, Paris, Tenn. 38242. The sodium silicate is obtained as a liquid from the Kraft Chemical Co. of Chicago. The mica of 325 mesh size is obtained from Perfection Mica of Bensenville, Ill. A four ounce container of a liquid of irreversible suspension of the foregoing composition is obtained and the Sagger's Clay, sodium silicate and the mica of 325 mesh is combined in parts by volume of 240 ml and the water is added in an amount of 50 ml.

As indicated above, the composition, since it is provided in an easily flowable form, may be applied to the working surface of the tool by either a dipping method, a brushing method, or a spraying method. It will further be appreciated that any other form of applying the fluid or flowable suspension to the tool surface will similarly be acceptable in the purview of the present invention, the only requirement being that the complete coating be applied to the tool surface. Once the coating is applied and permitted to dry, it has been found that a very tough and resistant fire and heat coating composition is provided.

While there has been described what is at present considered to be the preferred embodiments of the invention, it will be understood that various modifications may be made therein and it is intended to cover in the appended claims all such modifications as fall within the true spirit and scope of the invention.

What is claimed is:

1. A method of coating a tool surface to render the tool fire and heat resistant, comprising the steps of
   providing a tool having a surface utilized in connection with high heat and fire encountering applications,
   providing a composition consisting essentially of from about 3 to about 8 parts by volume of Sagger's Clay, about 3 parts to about 8 parts by volume of a soluble alkali silicate, from about 3 parts to about 8 parts by volume of granular mica in a laminated silica mineral form, and from about ½ part to about 2 parts by volume of water,
   applying said composition to the working surface of the tool which is intended for high heat and fire encountering application,
   and allowing said composition to fully dry on the surface of the tool thereby to provide a heat and fire resistant coating encasing the working surface of the tool.

2. A method as set forth in claim 1 above, wherein the composition provided includes sodium silicate as the alkali silicate component.

3. A method as set forth in claim 1 above, wherein the mica provided is in a finely divided granular form of at least 300 mesh.

4. A method as set forth in claim 1 above, wherein the composition provided for coating the working surface of the tool is formed by about 5 parts by volume of Sagger's Clay, about 5 parts by volume of sodium silicate, about 5 parts by volume of finely divided granular mica of at least 300 mesh, and about 1 part by volume of water.

5. A method as set forth in claim 1 above wherein the composition provided is applied to the working surface of the tool by means of dipping the tool into a composition so provided.

6. A method as set forth in claim 1 above, wherein the composition provided is applied to the working surface of the tool by spraying the composition directly onto the tool working surface.

7. A method as set forth in claim 1 above, wherein the composition so provided is applied to the working surface of the tool by brushing the same directly onto the working surface of the tool.

* * * * *